US008245935B2

(12) United States Patent
Vinogradov (10) Patent No.: US 8,245,935 B2
(45) Date of Patent: Aug. 21, 2012

(54) SELF-CALIBRATING, AUTOMATIC FOCUSING ASSEMBLY IN ELECTRO-OPTICAL READERS

(75) Inventor: Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 682 days.

(21) Appl. No.: 12/290,799

(22) Filed: Nov. 4, 2008

(65) Prior Publication Data

US 2010/0108765 A1    May 6, 2010

(51) Int. Cl.
*G06K 7/10* (2006.01)
*G06K 7/14* (2006.01)
*G02B 26/08* (2006.01)

(52) U.S. Cl. .................. 235/462.22; 235/454
(58) Field of Classification Search .............. 235/454, 235/462.22, 462.46
See application file for complete search history.

(56) References Cited

U.S. PATENT DOCUMENTS

| | | | |
|---|---|---|---|
| 5,308,960 A * | 5/1994 | Smith et al. ................. | 235/454 |
| 6,095,417 A * | 8/2000 | Ahlquist et al. ............. | 235/454 |
| 6,119,942 A | 9/2000 | Pierenkemper et al. | |
| 6,336,587 B1 * | 1/2002 | He et al. ................. | 235/462.22 |
| 6,340,114 B1 * | 1/2002 | Correa et al. ............ | 235/462.22 |
| 7,201,318 B2 | 4/2007 | Craen et al. | |
| 2005/0011952 A1 * | 1/2005 | Krichever ................. | 235/454 |
| 2007/0063048 A1 * | 3/2007 | Havens et al. ............ | 235/462.46 |
| 2008/0158633 A1 | 7/2008 | Mogi | |

FOREIGN PATENT DOCUMENTS

DE 19726581 A1 1/1999

OTHER PUBLICATIONS

International Search Report and Written Opinion dated Jan. 13, 2010 in related case PCT/US2009/061831.
International Preliminary Report on Patentability dated May 19, 2011 in related case PCT/US2009/061831.

\* cited by examiner

*Primary Examiner* — Thien T Mai
(74) *Attorney, Agent, or Firm* — Nong-Qiang Fan (57) ABSTRACT

An electro-optical reader for, and method of, reading a symbol, utilize a light source for emitting a light beam along a path, an optical assembly including a variable focusing element for focusing a major light fraction of the light beam between a range of working distances in which the symbol to be read is located along the path, and a controller for controlling the variable focusing element to have different focusing states. One of the focusing states is a reference focusing state in which the variable focusing element is operative for focusing the major light fraction at a reference focal plane. A detector assembly, including a detector aperture located at the reference focal plane, is operative for detecting an amount of a minor light fraction of the light beam, and for generating a self-calibration signal indicative of the reference focusing state when a predetermined amount of the minor light fraction has been detected. The controller is operative for processing the self-calibration signal to determine the reference focusing state for the variable focusing element during reading.

19 Claims, 5 Drawing Sheets

SELF-CALIBRATING, AUTOMATIC FOCUSING ASSEMBLY IN ELECTRO-OPTICAL READERS

DESCRIPTION OF THE RELATED ART

Moving laser beam readers or laser scanners have been used, in both handheld and hands-free modes of operation, in supermarkets, warehouse clubs, department stores, and other kinds of retailers for many years, to electro-optically read one-dimensional bar code symbols, particularly of the Universal Product Code (UPC) type, each having a row of bars and spaces spaced apart along one direction. A laser beam reader generally includes a laser for emitting a laser beam, a focusing lens assembly for focusing the laser beam to form a beam spot having a certain size at a predetermined working distance or focal plane, a scan component for repetitively scanning the beam spot across a target symbol in a scan pattern, for example, a line or a series of lines across the target symbol, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

It is desirable that the symbol be capable of being scanned over an extended range of working distances relative to the reader. For this purpose, it is conventional to move one or more automatic focusing lenses in the focusing lens assembly and, in turn, to move the focal plane of the laser beam between close-in and far-out working distances relative to the reader in the range. This lens movement is typically performed mechanically, and often under the guidance of a rangefinder. However, this is disadvantageous for several reasons. First, the mechanical movement generates vibrations that are propagated through the reader to a user's hand in a handheld mode of operation, and may also generate dust to obscure the lens assembly, and may cause parts to wear out over time. Moreover, the vibrations can generate objectionable, annoying, audible hum. In addition, the mechanical lens movement requires a drive that, in turn, consumes electrical power, is expensive and slow, can be unreliable, occupies space and increases the overall weight, size and complexity of the reader.

To avoid such mechanical movement, a variable focus liquid lens based on an electro-wetting effect has been proposed in U.S. Pat. No. 7,201,318 and No. 7,264,162 for use in laser beam readers, in which an electrical voltage is applied to the liquid lens to change an optical power or property, e.g., a focal length, thereof in accordance with a transfer function that resembles a parabola when a reciprocal of focal length is plotted against the applied voltage. The liquid lens, however, has an unpredictable, nonlinear, curved transfer function and, in practice, exhibits a hysteresis property, in which the transfer function for increasing applied voltages is different from the transfer function for decreasing applied voltages. Also, the transfer function is distorted by ambient temperature, in that the transfer function at lower temperatures is different from that at higher temperatures.

It has further been proposed, for example, in U.S. Pat. No. 4,190,330, No. 5,305,731, and No. 6,859,333 to achieve variable focusing using liquid crystal (LC) materials and liquid cells of the type used in optical displays. However, the known LC cells are not entirely uniform or homogeneous and undesirably scatter light, thereby producing a non-uniform optical response.

Thus, the known automatic focusing assemblies based on mechanical lenses, liquid lenses and LC cells, hereinafter sometimes collectively called "variable focusing elements," have not proven to be generally satisfactory for their intended purpose, because it is difficult to accurately determine a reference state, or focal point location, for the variable focusing element relative to the laser over such factors as time, temperature and usage. For example, it is not readily possible in the art to accurately determine a reference position for the movable mechanical lens relative to the laser, since the reference position changes with time, temperature and wear. Also, it is not readily possible in the art to accurately determine a reference optical power for the liquid lens, since the reference optical power changes with time, temperature and hysteresis. In addition, it is not readily possible in the art to accurately determine a reference optical power for the LC cell, since the reference optical power changes with time, temperature and nonuniform optical response. The known automatic focusing assemblies thus lose their calibration, and this lack of accurate self-calibration degrades reader performance and working range.

SUMMARY OF THE INVENTION

One feature of this invention resides, briefly stated, in an electro-optical reader for, and a method of, reading a symbol, such as one- and/or two-dimensional bar code symbols. The reader includes a light source, such as a laser, for emitting a laser beam along a path, and an optical assembly that includes a variable focusing element for focusing a major light fraction of the laser beam between a range of working distances in which the symbol to be read is located along the path. The optical assembly preferably also includes a fixed focusing lens and a focusing aperture together operative for generally collimating the laser beam.

A controller is operative for controlling the variable focusing element to have different focusing states. One of the focusing states is a reference focusing state in which the variable focusing element is operative for focusing the major light fraction at a reference focal plane. A detector assembly is located at the reference focal plane for detecting an amount of a minor light fraction of the light beam, and for generating a self-calibration signal indicative of the reference focusing state when a predetermined amount of the minor light fraction has been detected. The controller is operative for processing the self-calibration signal to determine the reference focusing state for the variable focusing element during reading. A memory is accessible by the controller for storing the self-calibration signal.

In one embodiment, the variable focusing element is a variable liquid crystal (LC) lens having a changeable optical index of refraction, and the controller is operative for changing the index of refraction in the different focusing states. In another embodiment, the variable focusing element is an electro-wetting liquid lens having a liquid with a changeable curvature, and the controller is operative for changing the curvature of the liquid in the different focusing states. In still another embodiment, the variable focusing element is a movable lens, and the controller is operative for moving the lens in the different focusing states.

Advantageously, a light separator is operative for separating the laser beam into the major light fraction and the minor light fraction. In one embodiment, the light separator is a beam splitter for passing the major light fraction through the beam splitter, and for reflecting the minor light fraction away from the beam splitter. In another embodiment, the light separator is a fold mirror for reflecting the major light fraction away from the fold mirror, and for enabling the major light fraction to bypass the fold mirror.

The detector assembly includes a light detector, a detector lens and a detector aperture at the reference focal plane. The predetermined amount of the minor light fraction is a maximum amount detected by the detector. The detector is operative for detecting amounts of the minor light fraction less than the maximum amount when the variable focusing element is not in the reference focusing state.

The method is performed by emitting a light beam along a path, focusing a major light fraction of the light beam between a range of working distances in which the symbol to be read is located along the path by varying a variable focusing element, controlling the variable focusing element to have different focusing states, one of the focusing states being a reference focusing state in which the variable focusing element focuses the major light fraction at a reference focal plane, detecting an amount of a minor light fraction of the light beam at the reference focal plane, generating a self-calibration signal indicative of the reference focusing state when a predetermined amount of the minor light fraction has been detected, and processing the self-calibration signal to determine the reference focusing state for the variable focusing element during reading.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
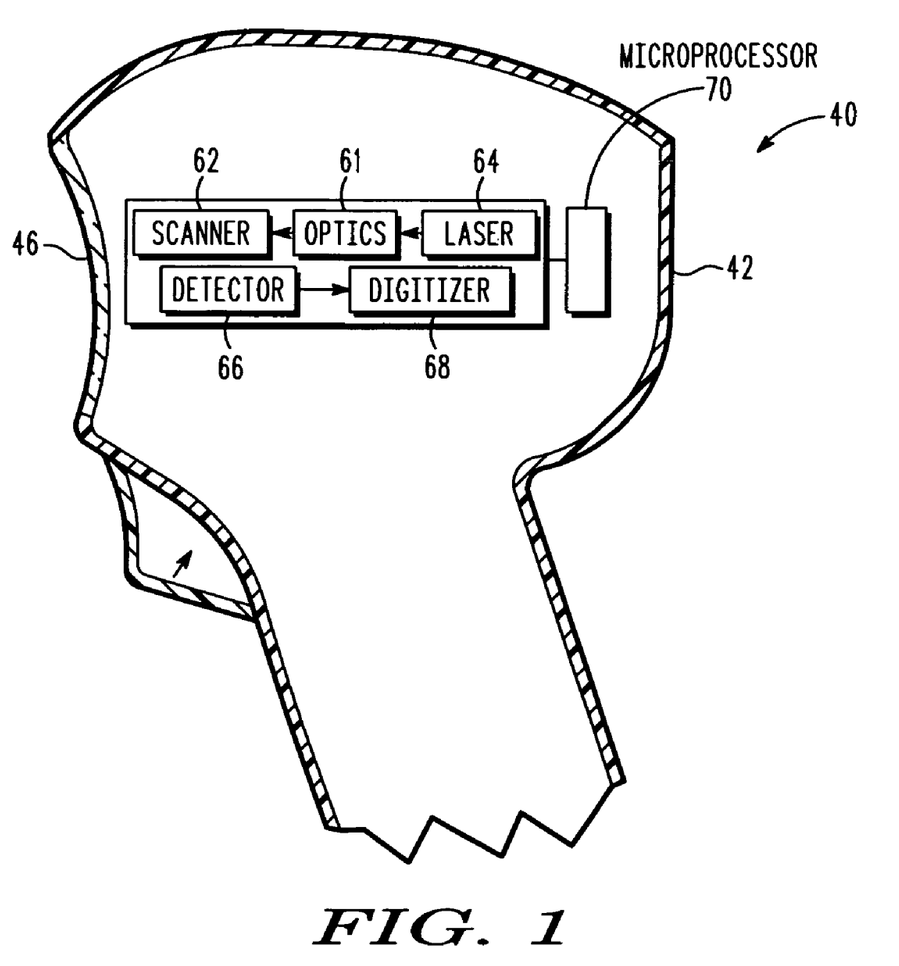
FIG. 1 is a schematic diagram of a handheld moving laser beam reader for reading a bar code symbol.

FIG. 1 depicts a conventional moving laser beam reader 40 for electro-optically reading indicia, such as a symbol, that may use, and benefit from, the present invention. The beam reader 40 includes a scanner 62 in a housing 42 for scanning an outgoing laser beam from a laser 64 and/or a field of view of a light detector or photodiode 66 in a scan pattern, typically comprised of one or more scan lines, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field or range of working distances, and a digitizer 68 for converting an electrical analog signal generated by the detector 66 from the return light into a digital signal for subsequent decoding by a microprocessor or controller 70 into data indicative of the symbol being read.

Figure 5:
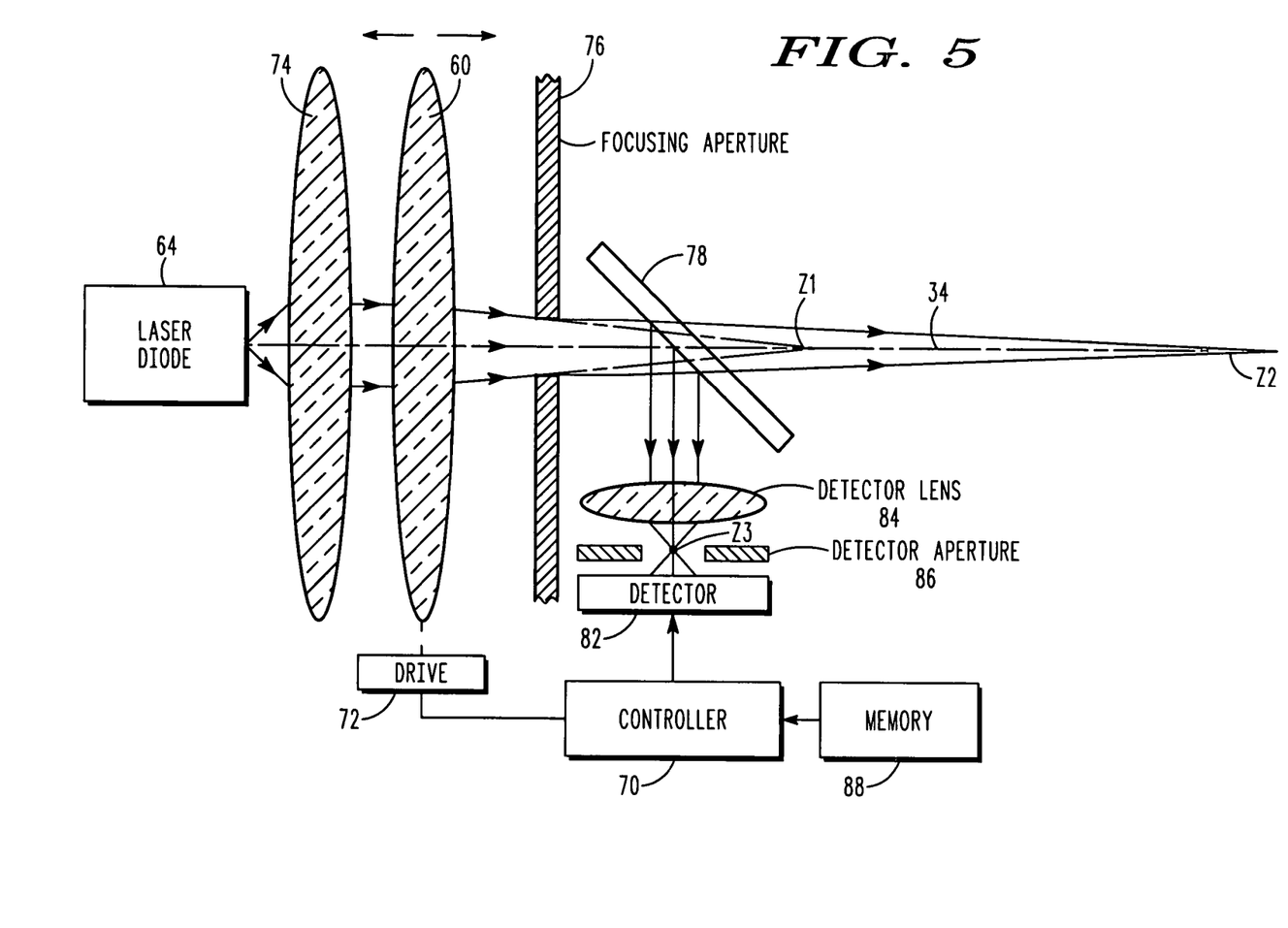
FIG. 5 is a diagrammatic view of another embodiment of an arrangement according to this invention using a movable lens in the reader of FIG. 1.

The focusing lens assembly 61 includes a variable focusing element for extending the range of working distances relative to the reader, as described above. The variable focusing element may be a liquid lens of the electro-wetting type 30 as shown in FIG. 2, or of the liquid crystal type 10 as shown in FIG. 3, or a movable lens 60 as shown in FIG. 5.

Figure 2:
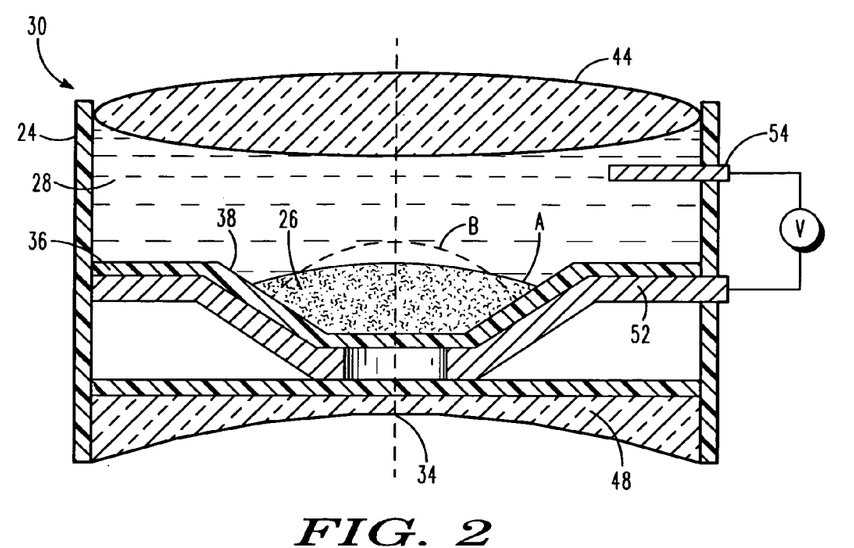
FIG. 2 is an enlarged, sectional view of a variable liquid lens of the electro-wetting type used in the reader of FIG. 1.
Figure 3:
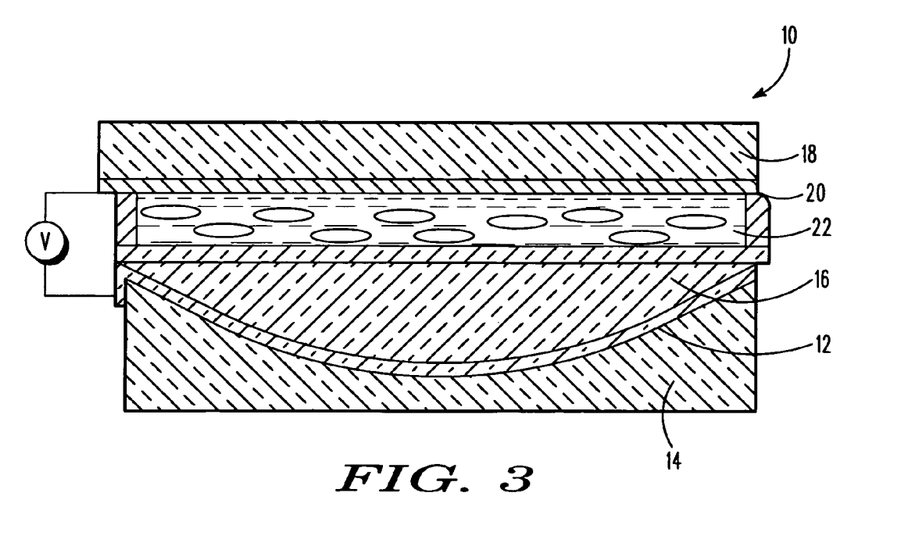
FIG. 3 is a diagrammatic view of a variable liquid crystal (LC) lens used in the reader of FIG. 1.

The electro-wetting liquid lens 30 of FIG. 2 has a housing 24 in which a first liquid 26, shown in droplet form, and a second liquid 28 are arranged along an optical path 34 that extends toward an indicia such as the indicia or symbol to be read. The liquids 26, 28 are light-transmissive, immiscible, of different optical indices of refraction, and of a substantially same density. The liquid or drop 26 is constituted of an electrically insulating substance. For example, an oil, an alcane, or a blend of alcanes, preferably halogenated, or any other insulating liquid may be used for the drop 26. The liquid 28 is constituted of an electrically conductive substance, for example, water loaded with salts (mineral or other), or any other liquid, organic or not, and preferably made conductive by the addition of ionic components.

The housing 24 is constituted of an electrically insulating, light-transmissive, material, such as glass, preferably treated with silane or coated with a fluorinated polymer, or a laminate of fluorinated polymer, epoxy resin and polyethylene. The housing 24 includes a dielectric wall 36, preferably having a well 38 in which the drop 26 is accommodated in symmetrical relation relative to the optical path or axis 34. The wall 36 normally has a low wetting characteristic compared to the drop 26, but a surface treatment insures a high wetting characteristic and maintains a centered position of the drop 26 and prevents the drop from spreading. The well 38 further helps to prevent such spreading.

A first electrode 54 extends into the liquid 28, and a second electrode 52 is located below the wall 36. The electrodes are connected to a voltage source V. The electrodes, especially electrode 52, are preferably light-transmissive. When a voltage is applied across the electrodes, an electrical field is created which alters the wetting characteristic of the wall 36 with respect to the drop 26. The wetting increases substantially in the presence of an electrical field. With no voltage applied, the drop 26 takes the generally hemispherical shape in a rest state shown in solid lines in FIG. 2, and its outer surface "A" is convex. When a voltage is applied, the wetting of the dielectric wall 36 increases, and the drop 26 deforms and takes the shape shown in dashed lines in FIG. 2, and its outer surface "B" is more convex with a smaller radius of curvature. This deformation of the drop changes the focus of the lens 30 and is employed to adjust the focal length of the focusing lens assembly 61 to focus the laser beam on the target over a range of working distances.

By way of example, the drop 26 in the rest state has a diameter of about 6 mm. If the liquid 28 is salt water, its index of refraction is about 1.35. If the drop 26 is oil, its index of refraction is about 1.45. About 40 diopters of focus variation can be achieved for an applied voltage of about 40 v RMS. The response time of the liquid lens is several hundredths of a second, in which case, if a periodic voltage is used, the frequency can be between 50 Hz and 10 kHz so that its period is smaller than the response time.

The liquid lens 30 may also have a fixed convex lens 44 at one axial end region, and a fixed concave, or plano-concave, lens 48 at the opposite axial end region. These fixed lenses may be part of the overall focusing lens assembly 61 and assist in minimizing any kind of aberrations, for example, chromatic aberrations.

As described so far, the change in curvature of the drop 26 is between two convex curvatures A, B. It is also within the spirit of this invention to deform the drop 26 between different curvatures. For example, it is possible that the outer surface of the drop could be a meniscus, that is concave in the rest state, generally flat to focus the light at a first focal plane when a first voltage is applied, and convex to focus the light at a second focal plane when a second, different voltage is applied.

The variable liquid crystal (LC) lens 10 of FIG. 3 has a first, glass or polymer, substrate 13 having a lower portion 14 with a concave surface, an upper portion 16 with a convex surface of complementary contour to the concave surface, and a curved, optically transparent, electrically conductive, electrode 12 made from a material such as indium-tin-oxide between the upper and lower portions of the substrate 13. The LC lens 10 also has a second, glass or polymer, generally planar substrate 18 having a surface coated with a generally planar, optically transparent, electrically conductive, electrode 20. The two substrates 13 and 18 face an LC layer or cell 22, and are coated with alignment layers (not shown). Alignment layers are used on the opposing surfaces of the substrates adjacent to the LC layer to produce a homogeneous alignment. Persons skilled in the art may select from a wide variety of materials, usually polyimides, including, but not limited to, polyvinyl alcohol (PVA) for use as alignment layers on the substrates. The LC layer is injected into the cell.

The LC layer 22 has at least one semi-ordered, mesomorphic or nematic phase, in addition to a solid phase and an isotropic liquid phase. Molecules of the nematic LC layer typically are rod-shaped with the average direction of the long axes of the rod-shaped molecules being designated as the director, or may be disk-shaped with the direction perpendicular to the disk-shaped molecules being designated as the director. The nematic phase is characterized in that the directors are aligned in a preferred direction.

Birefringence in nematic LC materials is most readily described in terms of a splitting of incoming light entering the LC layer into two perpendicularly polarized rays called the ordinary ray and the extraordinary ray. A variation in a refractive index of the LC layer 22 with respect to the extraordinary ray is effected by varying the angle between the directors relative to the direction of the incoming light. Such tilting of the directors in the LC layer is produced by varying the strength of an electric or magnetic field across the LC layer 22. The directors typically tend to align themselves generally parallel to the direction of the electric or magnetic field. There is a threshold field strength below which the directors do not appreciably respond to the applied field and above which they respond monotonically as the field strength increases until realignment in response to the field reaches saturation.

The refractive index of the LC layer 22 changes in response to a change of field strength to produce a variation of optical properties, e.g., focal length, in the focusing lens assembly 61 in the reader 40. When a voltage V is applied across the electrodes 12, 20, the electric field will produce a centrosymmetrical gradient distribution of refractive index within the LC layer 22. The LC layer 22 causes light to be modified, e.g., focused, when a suitable voltage is applied across the electrodes.

The voltage for either liquid lens 10, 30 is preferably periodic, preferably a square wave drive voltage. The square wave is easily created with a variable duty cycle by the microprocessor or controller 70 having a built-in pulse width modulator circuit. The drive voltage could also be sinusoidal or a triangular wave signal, in which case, the amplitude of the voltage controls the shape of the drop 26 or the refractive index of the LC layer 22 and, in turn, the focal length and the working distance. When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the microprocessor or controller 70. The voltage could also be a constant DC voltage.

The controller 70 may operate to apply the voltage to either liquid lens 10, 30 at all times, or at selected times. Thus, the voltage can be applied for each read, or for every other read, etc. The voltage can be applied not only during reading, but even afterward. The voltage can be initiated at the pull of a trigger on the reader, or only after a symbol has been detected. The voltage can be applied automatically, or only after a signal analyzer, preferably another microprocessor, has determined that the symbol has not yet been successfully decoded and read.

Figure 4:
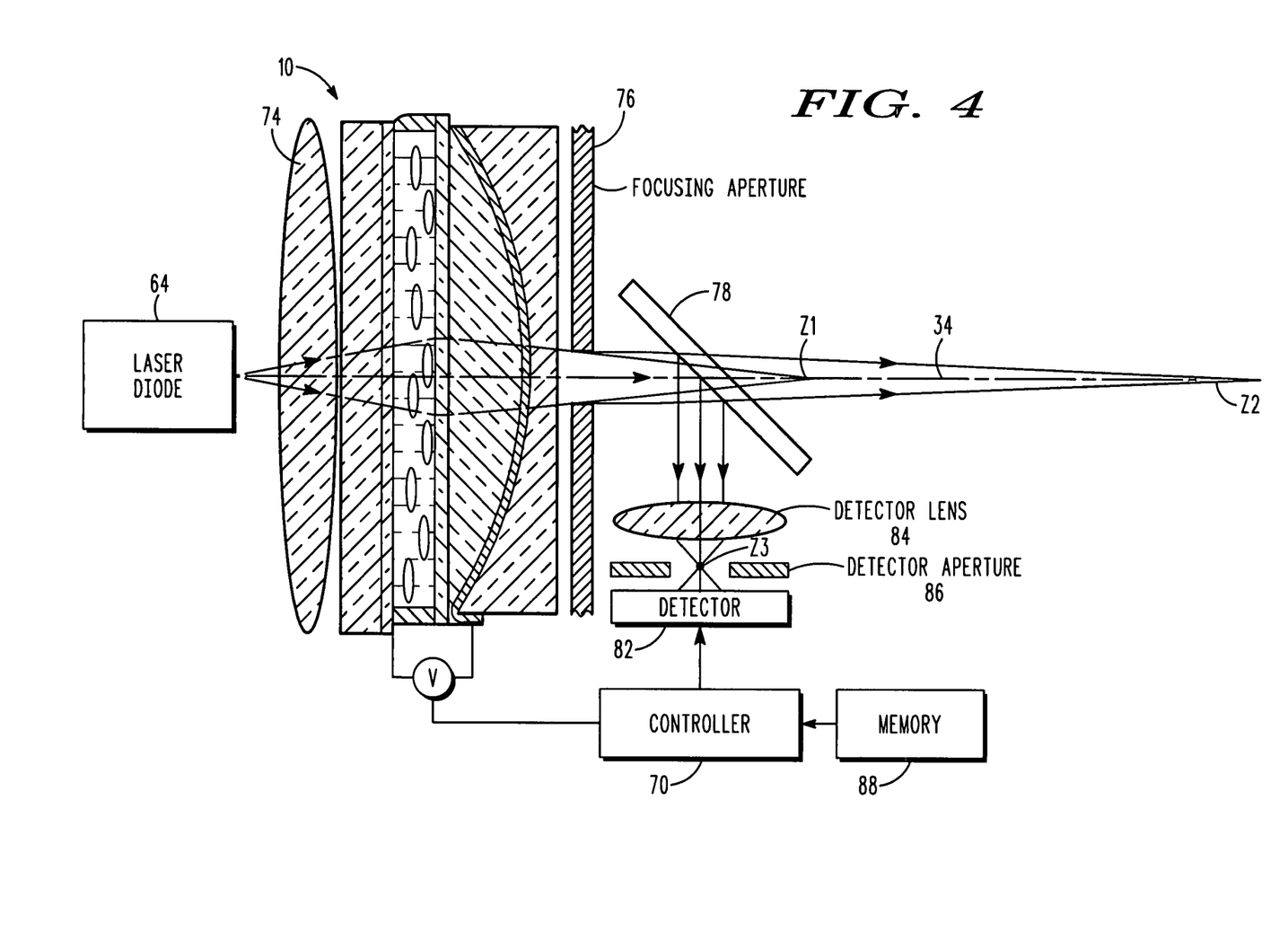
FIG. 4 is a diagrammatic view of one embodiment of an arrangement according to this invention using the LC lens in the reader of FIG. 1.
Figure 6:
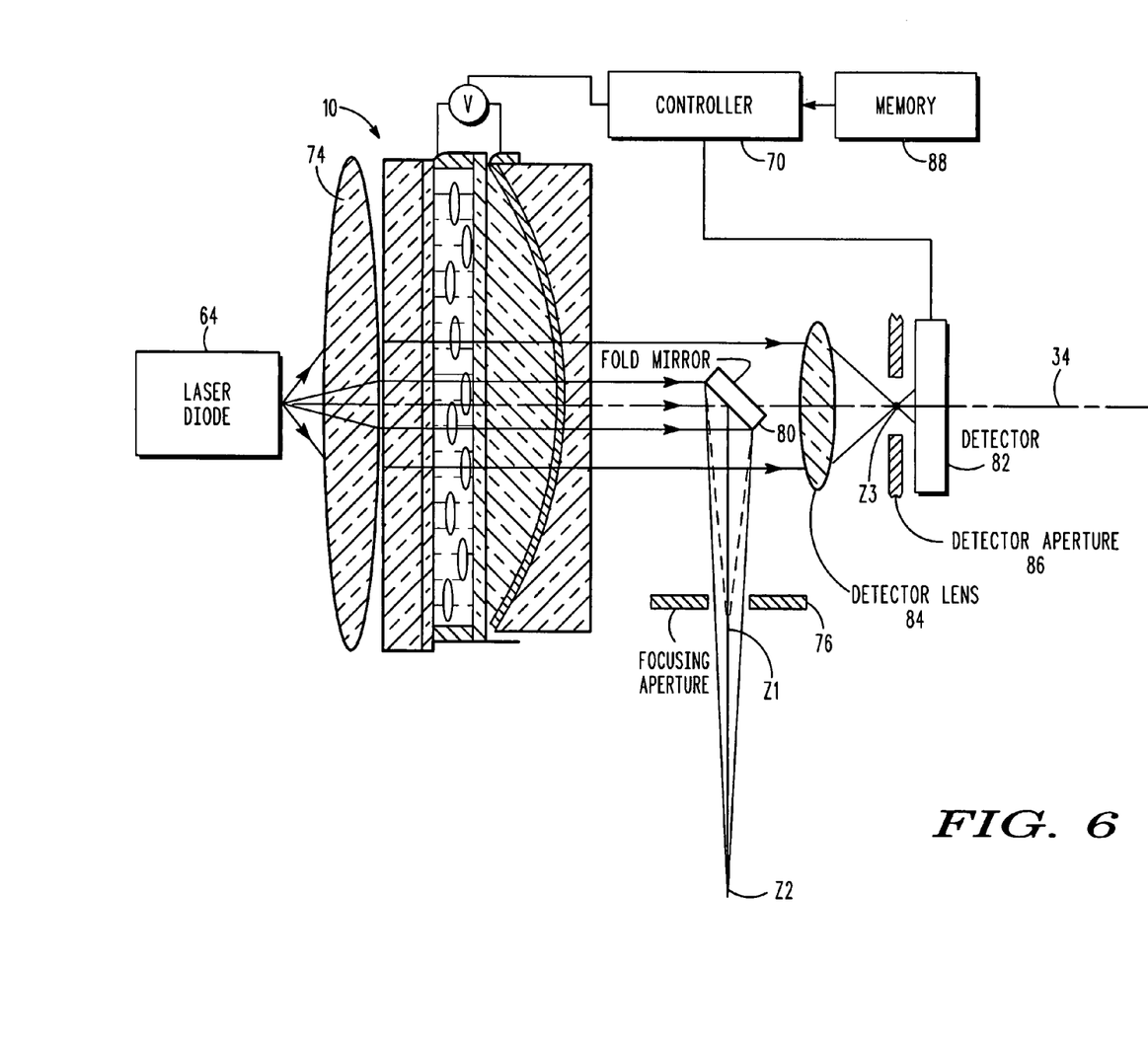
FIG. 6 is a diagrammatic view of yet another embodiment of an arrangement according to this invention using the LC lens in the reader of FIG. 1.

Turning now to FIGS. 4-6, the light source 64 of FIG. 1 is shown as a laser diode operative for emitting a laser beam along the optical path 34. The change in voltage in either liquid lens 10, 30, or the movement of the mechanical lens 60 by a drive 72, all under the control of the controller 70, is responsible for varying the focal point location between a close-in position or plane Z1 and a far-out position or plane Z2 arranged along the optical path 34. The symbol can be read at, and anywhere between, these end-limiting positions, thereby improving the working range of the moving beam reader 40. The focusing lens assembly 61 preferably also includes a fixed focusing lens 74 and a focusing aperture stop 76 together operative for generally collimating the laser beam.

A light separator is operative for separating the laser beam into a major light fraction and a minor light fraction. In the embodiment of FIGS. 4-5, the light separator is a beam splitter 78 for passing the major light fraction through the beam splitter 78, and for reflecting the minor light fraction away from the beam splitter 78. In the embodiment of FIG. 6, the light separator is a fold mirror 80 for reflecting the major light fraction away from the fold mirror 80, and for enabling the major light fraction to bypass the fold mirror 80.

In each embodiment, the controller 70 is operative for controlling the variable focusing element 10, 30, 60 to have different focusing states. One of the focusing states is, as described above, responsible for focusing the major light fraction of the laser beaus at the close-in position Z1. Another of the focusing states is, as described above, responsible for focusing the major light fraction of the laser beam at the far-out position Z2. Still another of the focusing states is a reference focusing state in which the variable focusing element 10, 30, 60 is operative for focusing the major light fraction of the laser beam at a reference focal position or plane Z3.

This reference focusing state serves to determine a calibration value or standard against which other focal positions between the close-in and the far-out positions Z1-Z2 along the path 34 are referenced. Thus, the reference focusing state accurately determines a reference position for the movable mechanical lens 60 relative to the laser 64, despite inevitable changes of the reference position over time, temperature and wear. Also, the reference focusing state accurately determines a reference optical power for each liquid lens 10, 30, despite inevitable changes of the reference optical power over time, temperature, hysteresis and non-uniform optical response.

A detector assembly includes a light detector 82, a detector lens 84 and a detector aperture 86 at the reference focal plane Z3, and is operative for detecting and tracking an amount of the minor light fraction of the laser beam incident on the detector 82. The minor light fraction is focused by the detector lens 84 at the detector aperture 86. Since the aperture 86 is located in the reference focal plane Z3, which is at the conjugated distance away from the laser 64, the focused amount of the minor light fraction is a maximum detected by the detector 82 when the variable focusing element is in the reference focusing state. The detector 82 is operative for detecting amounts of the minor light fraction less than the maximum amount when the variable focusing element is not in the reference focusing state.

The detector assembly generates a self-calibration signal indicative of the reference focusing state when the maximum amount of the minor light fraction has been detected. The controller 70 is operative for processing the self-calibration signal to determine the reference focusing state for the variable focusing element during reading. A memory 88 is accessible by the controller 70 for storing the self-calibration signal.

It will be understood that each of the elements described above, or two or more together, also may find a useful application in other types of constructions differing from the types described above. For example, the liquid lens 30 can replace the liquid lens 10 in each of FIGS. 4 and 6. Also, the mechanical lens 60 can replace the liquid lens 10 in FIG. 6.

While the invention has been illustrated and described as embodied in a self-calibrating, automatic focusing assembly and method in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An electro-optical reader for reading a symbol, comprising:
   a light source for emitting a light beam along a path;
   a light separator for separating the light beam from the light source into a major light fraction projected towards the symbol and a minor light fraction reflected away from the light separator;
   an optical assembly including a variable focusing element for focusing the major light fraction of the light beam between a range of working distances in which the symbol to be read is located along the path;
   a controller for controlling the variable focusing element to have different focusing states, one of the focusing states being a reference focusing state in which the variable focusing element is operative for focusing the major light fraction at a reference focal plane; and
   a detector assembly at the reference focal plane for detecting all amount of the minor light fraction of the light beam reflected from the light separator, and for generating a self-calibration signal indicative of the reference focusing state when a predetermined amount of the minor light fraction has been detected, the controller being operative for processing the self-calibration signal to determine the reference focusing state for the variable focusing element during reading.

2. The reader of claim 1, wherein the light source is a laser for emitting the light beam as a laser beam, and wherein the optical assembly includes a fixed focusing lens and a focusing aperture together operative for generally collimating the laser beam.

3. The reader of claim 1, wherein the variable focusing element is a variable liquid crystal (LC) lens having a changeable optical index of refraction, and wherein the controller is operative for changing the index of refraction in the different focusing states.

4. The reader of claim 1, wherein the variable focusing element is an electro-wetting liquid lens having a liquid with a changeable curvature, and wherein the controller is operative for changing the curvature of the liquid in the different focusing states.

5. The reader of claim 1, wherein the variable focusing element is a movable lens, and wherein the controller is operative for moving the lens in the different focusing states.

6. The reader of claim 1, and wherein the light separator is a beam splitter for passing the major light fraction through the beam splitter, and for reflecting the minor light fraction away from the beam splitter.

7. The reader of claim 1, and wherein the light separator is a fold mirror for reflecting the major light fraction away from the fold mirror, and for enabling the major light fraction to bypass the fold mirror.

8. The reader of claim 1, wherein the detector assembly includes a light detector, a detector lens and a detector aperture at the reference focal plane, and wherein the predetermined amount of the minor light fraction is a maximum amount detected by the detector, and wherein the detector is operative for detecting amounts of the minor light fraction less than the maximum amount when the variable focusing element is not in the reference focusing state.

9. The arrangement of claim 1, and a memory accessible by the controller for storing the self-calibration signal.

10. An electro-optical reader for reading a symbol, comprising:
    means for emitting a light beam along a path;
    means for separating the light beam from the light source into a major light fraction projected towards the symbol and a minor light fraction reflected away from a light separator;
    means including a variable focusing element for focusing the major light fraction of the light beam between a range of working distances in which the symbol to be read is located along the path;
    means for controlling the variable focusing element to have different focusing states, one of the focusing states being a reference focusing state in which the variable focusing element is operative for focusing the major light fraction at a reference focal plane; and
    means at the reference focal plane for detecting an amount of the minor light fraction of the light beam reflected away from a light separator, and for generating a self-calibration signal indicative of the reference focusing state when a predetermined amount of the minor light fraction has been detected, the controlling means being operative for processing the self-calibration signal to determine the reference focusing state for the variable focusing element during reading.

11. A method of reading a symbol, comprising the steps of:
    emitting a light beam along a path;
    separating the light beam from the light source into a major light fraction projected towards the symbol and a minor light fraction reflected away from a light separator;

focusing the major light fraction of the light beam between a range of working distances in which the symbol to be read is located along the path by varying a variable focusing element;

controlling the variable focusing element to have different focusing states, one of the focusing states being a reference focusing state in which the variable focusing element focuses the major light fraction at a reference focal plane;

detecting an amount of the minor light fraction of the light beam reflected from the light separator at the reference focal plane;

generating a self-calibration signal indicative of the reference focusing state when a predetermined amount of the minor light fraction has been detected; and processing the self-calibration signal to determine the reference focusing state for the variable focusing element during reading.

12. The method of claim 11, wherein the emitting step is performed by a laser that emits the light beam as a laser beam, and wherein the focusing step is performed by a fixed focusing lens and a focusing aperture together operative for generally collimating the laser beam.

13. The method of claim 11, and configuring the variable focusing element as a variable liquid crystal (LC) lens having a changeable optical index of refraction, and wherein the controlling step is performed by changing the index of refraction in the different focusing states.

14. The method of claim 11, and configuring the variable focusing element as an electro-wetting liquid lens having a liquid with a changeable curvature, and wherein the controlling step is performed by changing the curvature of the liquid in the different focusing states.

15. The method of claim 11, and configuring the variable focusing element as a movable lens, and wherein the controlling step is performed by moving the lens in the different focusing states.

16. The method of claim 11, wherein the major light is separated by passing the major light fraction through a beam splitter, and the minor-light is separated by reflecting the minor light fraction away from the beam splitter.

17. The method of claim 11, wherein the major light is separated by reflecting the major light fraction away from a fold mirror, and the minor-light is separated by enabling the major light fraction to bypass the fold mirror.

18. The method of claim 11, wherein the detecting step is performed by a light detector, a detector lens and a detector aperture at the reference focal plane, and wherein the predetermined amount of the minor light fraction is a maximum amount detected by the detector, and wherein the detecting step is further performed by detecting amounts of the minor light fraction less than the maximum amount when the variable focusing element is not in the reference focusing state.

19. The method of claim 11, and storing the self-calibration signal.

* * * * *

UNITED STATES PATENT AND TRADEMARK OFFICE
CERTIFICATE OF CORRECTION

PATENT NO. : 8,245,935 B2  
APPLICATION NO. : 12/290799  
DATED : August 21, 2012  
INVENTOR(S) : Vinogradov Page 1 of 1

It is certified that error appears in the above-identified patent and that said Letters Patent is hereby corrected as shown below:

In Column 6, Line 46, delete "beaus" and insert -- beam --, therefor.

Signed and Sealed this
Fifth Day of February, 2013

Teresa Stanek Rea
*Acting Director of the United States Patent and Trademark Office*